United States Patent
Matsuda

(10) Patent No.: US 7,123,902 B2
(45) Date of Patent: Oct. 17, 2006

(54) METHOD FOR SENDING AND RECEIVING A PLURALITY OF MAIL CONTENTS AND DISPLAY CONDITION INFORMATION

(75) Inventor: Masayuki Matsuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/769,352

(22) Filed: Jan. 30, 2004

(65) Prior Publication Data

US 2004/0214552 A1    Oct. 28, 2004

(30) Foreign Application Priority Data

Apr. 24, 2003    (JP) .............................. 2003-119198

(51) Int. Cl.
    *H04L 12/58* (2006.01)
(52) U.S. Cl. .................... 455/412.1; 709/206
(58) Field of Classification Search ............ 455/556.2, 455/412.1, 414.1; 379/114.13; 709/206, 709/207
    See application file for complete search history.

(56) References Cited

U.S. PATENT DOCUMENTS

| | | | |
|---|---|---|---|
| 5,579,535 A | * | 11/1996 | Orlen et al. ................ 455/421 |
| 6,292,473 B1 | * | 9/2001 | Duske et al. ............... 370/316 |
| 2002/0007383 A1 | * | 1/2002 | Yoden et al. ............... 707/536 |
| 2003/0126215 A1 | * | 7/2003 | Udell et al. ................. 709/206 |
| 2003/0229673 A1 | * | 12/2003 | Malik .......................... 709/207 |
| 2004/0198390 A1 | * | 10/2004 | Kaise ....................... 455/456.1 |

FOREIGN PATENT DOCUMENTS

| | | |
|---|---|---|
| JP | 08-008965 | 1/1996 |
| JP | 2002-133270 | 5/2002 |
| JP | 2002-244985 | 8/2002 |

* cited by examiner

*Primary Examiner*—Eliseo Ramos-Feliciano
*Assistant Examiner*—Emeka D. Iwuchukwu
(74) *Attorney, Agent, or Firm*—Townsend and Townsend, and Crew LLP

(57) ABSTRACT

Embodiments of the invention relate to a mail sending and receiving devices and methods. In one embodiment, a communication device comprises a display unit, and a receiving unit configured to receive a mail which includes a plurality of mail contents and condition information governing which of the plurality of mail contents can be displayed. A storage unit is configured to store the mail which is received by the receiving unit. A control unit is configured to control display of the plurality of mail contents by the display unit in response to the condition information, when a display instruction of the mail which is stored in the storage unit is inputted.

5 Claims, 6 Drawing Sheets

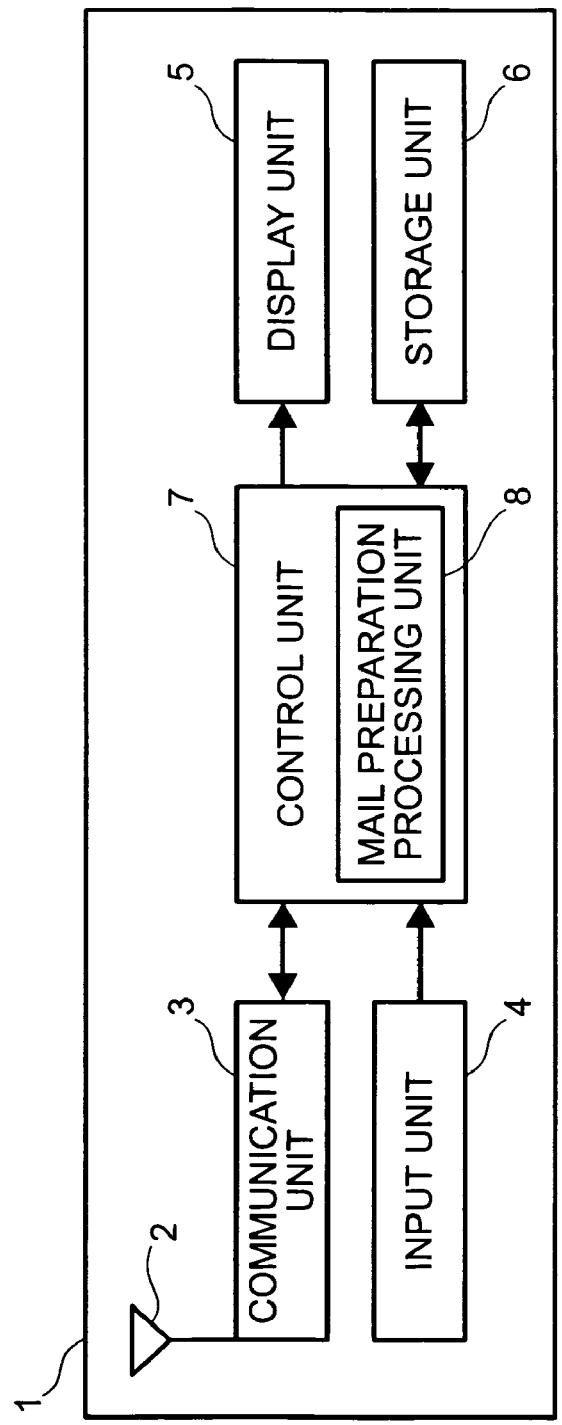
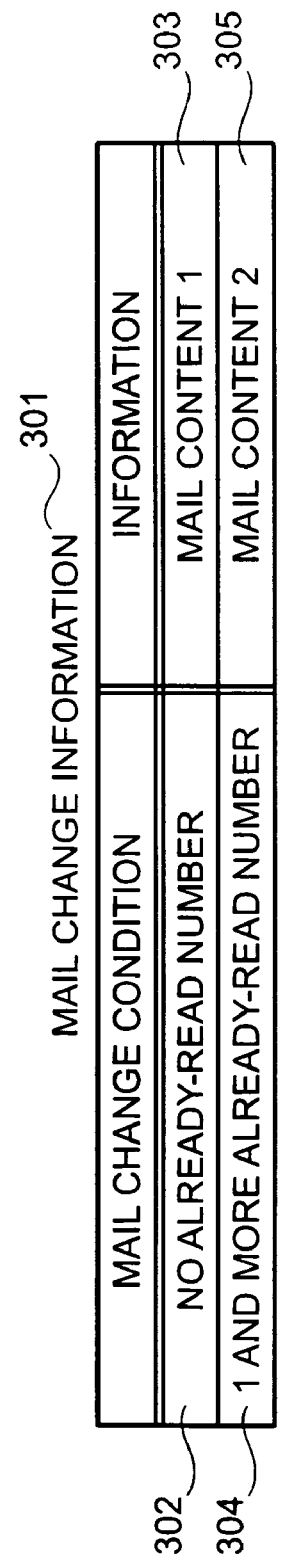

FIG.3

MAIL CHANGE INFORMATION ~601

| MAIL CHANGE CONDITION | INFORMATION |
|---|---|
| BEFORE 2003/09/10 | MAIL CONTENT 1 "MESSAGE FROM ○○SHOP! EVERY ITEM 30% OFF." |
| FROM 2003/09/11 UNTIL 2003/09/19 | MAIL CONTENT 2 "MESSAGE FROM ○○SHOP! EVERY ITEM 10% OFF." |
| AFTER 2003/09/20 | MAIL CONTENT 3 "MESSAGE FROM ○○SHOP! SERVICE IS EXPIRED." |

FIG.4

MAIL CHANGE INFORMATION 901

| MAIL CHANGE CONDITION | MAIL OPENING AVAILABILITY | INFORMATION |
|---|---|---|
| BEFORE LAPSE OF ONE WEEK AFTER OPENED | MAIL OPENING AVAILABLE | MAIL CONTENT 1 |
| AFTER LAPSE OF ONE WEEK AFTER OPENED | MAIL OPENING UNAVAILABLE | — |

METHOD FOR SENDING AND RECEIVING A PLURALITY OF MAIL CONTENTS AND DISPLAY CONDITION INFORMATION

CROSS-REFERENCES TO RELATED APPLICATIONS

This application relates to and claims priority from Japanese Patent Application No. 2003-119198, filed on Apr. 24, 2003, the entire disclosure of which is incorporated herein by reference.

BACKGROUND OF THE INVENTION

1. Field of the Invention

This invention relates to a mail sending and receiving system and a communication terminal which has a mail sending and receiving function.

2. Description of Related Art

Disclosed is such a system that an advertisement to be distributed and a selection condition of a customer segment as a target of the advertisement and distribution time are inputted to an advertisement sending apparatus, and the advertisement sending apparatus selects target persons with reference to customer information data base, and searches telephone numbers thereof, and distributes the advertisement via mail to selected target persons when the predetermined distribution time comes (e.g., see, JP-A-2002-133270 (patent document 1), page 2, FIG. 2).

Also, there is such an electric mail management method that, in order to have a receiver spot a message which is closer to time limit than others, attribute information such as level of urgency and the like is added to the mail at the sender side, and when a certain period has passed, the level of urgency is gradually changed (e.g., see JP-A-8-8965 (patent document 2), pages 3–4, FIG. 4).

For example, there is such a case that a discount advertisement is advertised with changing a discount rate, a target product and the like in response to time. Also, it is possible to improve usability if it becomes possible for a mail author to change a mail display content at a mail receiving side, in response to not only the time but also other conditions such as the number of times of opening a mail.

In the system which was described in the patent document 1, in case that a plurality of advertisements are distributed at staggered timings of distributions, mails have to be sent in a plurality of times separately by grouping the mails. Also, there is such a problem that, in case that a portable telephone at a receiving side is in a no service area at distribution time, an advertisement cannot be distributed timely. In contrast, the method, which is described in the patent document 2, can automatically change attribute information such as the level of urgency and the like at a receiver side, but there is no provision to change and display a message itself.

BRIEF SUMMARY OF THE INVENTION

Embodiments of this invention provide a mail sending and receiving method in which a sender side can control a mail display content at a receiver side, and a communication terminal which is used for this.

In accordance with an aspect of the present invention, a communication device comprises a display unit, and a receiving unit configured to receive a mail which includes a plurality of mail contents and condition information governing which of the plurality of mail contents can be displayed. A storage unit is configured to store the mail which is received by the receiving unit. A control unit is configured to control display of the plurality of mail contents by the display unit in response to the condition information, when a display instruction of the mail which is stored in the storage unit is inputted.

In accordance with another aspect of the invention, a communication device comprises a receiving unit configured to receive a mail which includes content and display condition information governing display of the content, and a storage unit configured to store the mail which is received by the receiving unit. A control unit is configured to control display of the content or to display a message showing that the content cannot be displayed, in response to the display condition information, when a display instruction of the mail which is stored in the storage unit is inputted.

In accordance with yet another aspect of the present invention, a communication device comprises a receiving unit configured to receive a mail which includes a plurality of mail contents and condition information governing which of the plurality of mail contents can be displayed, and a storage unit configured to store a plurality of mails which are received by the receiving unit. A display unit is configured to display a list of the plurality of mails which are stored in the storage unit. A control unit is configured to control display of the mail in the list of the plurality of mails with a symbol indicating that the mail includes a plurality of mail contents.

BRIEF DESCRIPTION OF THE DRAWINGS

FIG. 1 is a block diagram showing an example of a structure of a portable telephone which is used for mail preparation;

FIG. 2 is a view showing one example of mail change information;

FIG. 3 is a view showing one example of mail change information;

FIG. 4 is a view showing one example of mail change information;

DETAILED DESCRIPTION OF THE INVENTION

Figure 5:
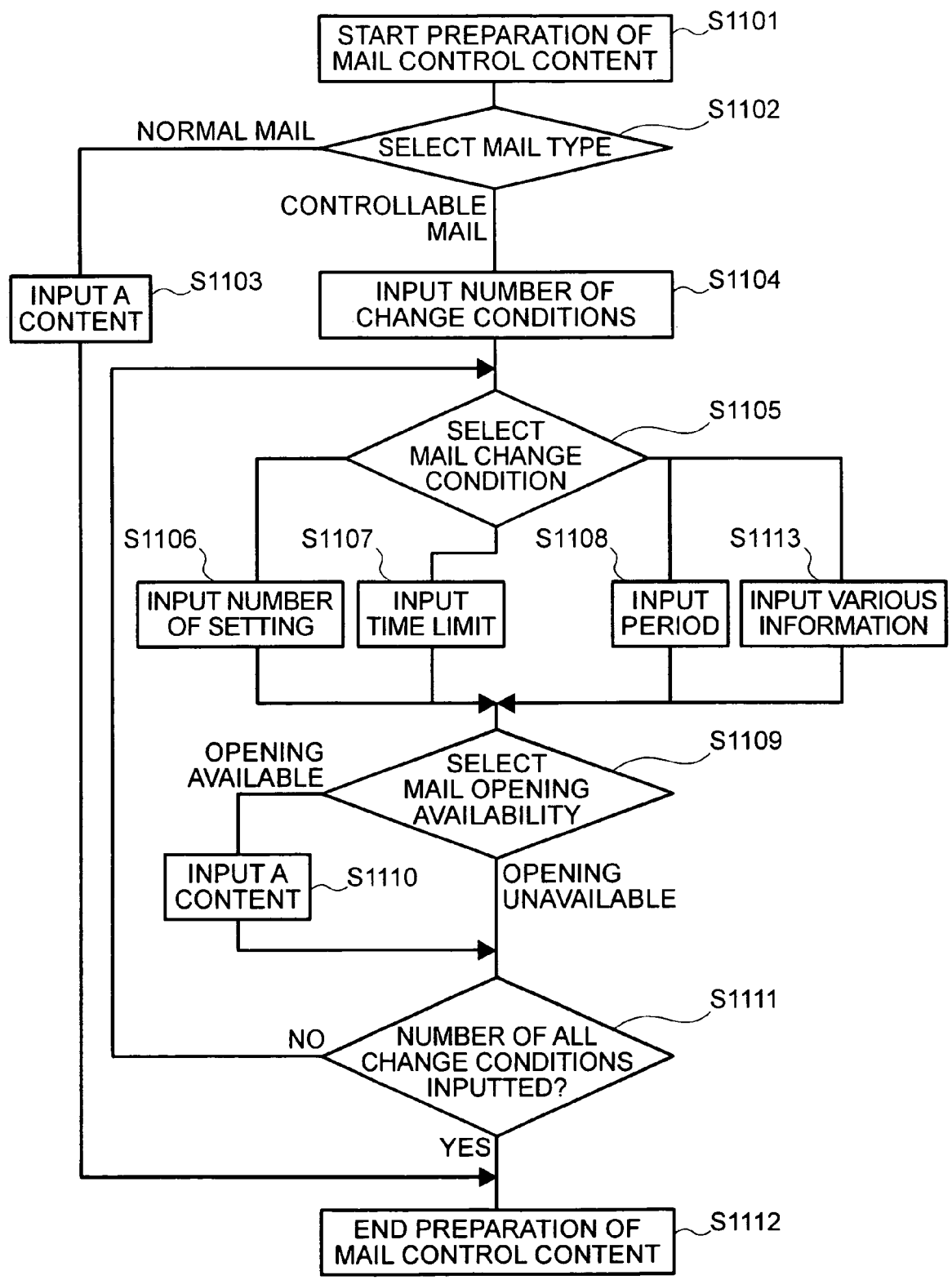
FIG. 5 is a flow chart showing a mail preparation processing according to an embodiment of the invention.

Hereinafter, embodiments of this invention will be described by use of the drawings.

First, a method for preparing a mail by use of a portable telephone 1 shown in FIG. 1 will be described. The portable telephone 1 has a communication unit 3 for carrying out sending and receiving processing of sound data, video data and the like, through an antenna 2. A display unit 5 is, for example, a liquid crystal display. Also, an input unit 4 is configured by dial keys for inputting numerals and characters, and function keys for carrying out a movement instruction of a cursor and a function selection. In this regard, however, a user may carry out a character input and a function selection by using and touching a touch panel type display unit such as the display unit 5 with his/her finger or a pen. By this, even in case that a user is not familiar with a key operation, a user can carry out an input operation easily. A storage unit 6 is a memory which includes a RAM(Random Access Memory) and a ROM(Read Only Memory), and stores address book data which includes names, telephone numbers, and mail addresses, and a control program which is executed in a control unit 7. The control unit 7 is a CPU, and controls display to the display unit 5, writing to the storage unit 6 and the like. Also, the control unit 7 has a mail preparation processing unit 8, and prepares a mail by converting data that a user inputted by use of the input unit 4 in accordance with a sending destination.

In addition, the mail preparation which is described in this embodiment may be used as a mail preparation method by a person through the use of not only a portable telephone but also a portable terminal device such as a PDA and a PC, and as a mail preparation method at a service company such as an advertisement sending company and at a communication carrier.

In this embodiment, in order to control mail display at a receiving side, mail change information is added to a mail and then, the mail is sent. Hereinafter, an example of the mail change information will be shown.

FIG. 2 shows an example of the mail change information 301 which is prepared in the case where it was desired to change a message content to be displayed in response to the number of opening instructions from a receiver. There are two change conditions, and shown is information for having a mail content 1 303 displayed in the case where an already-read number is treated as a mail change condition (302), and a receiver opened and read a mail for the first time (no already-read number), and for having a mail content 2 305 displayed in the case where the already-read number is 1 and above (304). By adding the suchlike mail change information to a mail and sending the mail, a sender side can present a plurality of information to a receiver by simply sending the mail once.

FIG. 3 shows an example of mail change information 601 which is prepared in the case where it was desired to change a message content to be displayed in response to time. This example shows information for having three mail contents 603, 605, 607 displayed in response to time limit, with three time limits of "BEFORE Sep. 10, 2003" 602, "FROM Sep. 11, 2003 UNTIL Sep. 19, 2003" 604, and "AFTER Sep. 20, 2000" 606 as a mail change condition. For example, in case that change of a service content has been determined in advance, by adding the suchlike mail change information to a mail and sending the mail, it is possible to carry out content display at a receiver side according to an instruction of a mail sender. Also, by adding the mail change information, even in a situation that a receiver side cannot accept receiving, such as "NO SERVICE AREA", it is possible to present information timely.

FIG. 4 is an example of mail change information which is prepared in the case where a mail preparation side wishes to permit mail browse only for one week after a mail was opened. In this example, information for showing yes or no of opening a mail is added to the mail change information 901, and a mail content 1 904 is displayed "BEFORE LAPSE OF ONE WEEK AFTER OPENED" 902, and "MAIL OPEN UNAVAILABLE" 906 is set "AFTER LAPSE OF ONE WEEK AFTER OPENED" 905. For example, there is a case that a sender wishes to prohibit browse of a mail text after a predetermined period has passed, such as a mail with a content of high confidentiality. By adding the mail change information 901 as shown in FIG. 4, it is possible to carry out display control of a receiver side at a sender side. In addition, this invention is not limited to setting of a period after a mail was opened, but it may involve setting of a period from time when a mail was received, and the like.

This mail change information is converted at the mail preparation processing unit 8 in response to a format of a receiving side, and is written in a header part of a mail. For example, information of "BEFORE LAPSE OF ONE WEEK AFTER OPENED" is entered as "Conditions: Opening, Period: 604800 sec, Restriction: Before". In a current mail system, it is designed such that a user can freely define a field beginning by "X-" of a header part. By writing the mail change information in this field, it is possible to realize this function in the existing mail system. In addition, it may be designed to newly provide a specific field in a header part of a mail and to write the mail change information therein.

In addition, entry of the mail change information is not limited to the header portion, but it may be written in a mail text as a mail control code. In this regard, however, since there is a possibility that, when it is written in the text of a mail, a user may rewrite it and cause a malfunction, entry into the header portion is desirable. Also, the mail change condition and information which shows yes or no of opening a mail (mail opening availability) may be entered into the header part, and information which is displayed at a receiving side may be entered into a mail text.

In addition, the mail change information shown in FIGS. 2, 3, and 4 are examples, and this invention is not limited thereto. A mail may be prepared by arbitrarily combining the mail change information and the mail opening availability. For example, in the examples of FIGS. 2 and 3, mail opening availability information is omitted, but even in the case where mail opening is not prohibited, the mail opening availability information may be added. Also, it may be designed such that, as mail change condition, location information is entered, and in case of having entered in a specific location such as an amusement park and a movie theater, restricted information such as service information can be seen. Also, by combining a location and time as a change condition, in a specific location such as a stage theater where a terminal at a receiving side cannot receive a mail, it is possible to present information in response to time. Also, it may be designed such that a carrier side sends a mail with cumulative duration of a call, cumulative charge for a call, and cumulative amount of data communication as a change condition, and service information is presented to a user who talked on the telephone for more than predetermined time.

Also, in the case where opening of a mail is not prohibited, there is no problem even if all information of a mail is presented at a time point when a user received the mail. For example, using the example of FIG. 3, it is possible to provide such a function that a user can read information which should be presented during a period of "FROM Sep. 11, 2003 UNTIL Sep. 19, 2003" and information which should be presented "AFTER Sep. 20, 2003", at a time point of "BEFORE Sep. 10, 2003". By this, it becomes possible for a user to be aware of how a content of a received mail is changed from the time point forward. And, since a user can delete a mail when a user has judged that it is not necessary to save the mail, it is possible to economize the saving capacity of a mail box, and it becomes possible improve the usability of a user.

In this regard, however, in the case where opening of a mail is prohibited, as a matter of course, it is not possible to present information outside of the period until a predetermined period, which was defined in the mail change condition, has passed and the like.

Also, information for display control is not limited to text data, but may include, for example, still picture data and motion picture data. In this case, the data is attached to a mail as an attached file, and the mail change condition is entered in the header part.

In addition, it is also conceivable that there occurs a need to attach a plurality of files, in order to have a still picture and a motion picture changed in response to a period and the like. In this case, unlike the case of text data, since an amount of data communication increases, on the occasion of receiving a mail, there is a concern that the communication charge will increase, and in particular, there occurs a program in case that a plurality of files are attached to a so-called a spam mail (nuisance e-mail). Therefore, it is desirable to provide such a function that an attached file such as a still picture and a motion picture is saved in a server side, and only text data is sent to a user. That is, it is desirable to provide such a function that only text data is sent, and in response to the mail change condition, a message of whether a necessary attached file is downloaded or not is displayed, and only in case that a user selected to download, the attached file is received.

FIG. 5 is a flow chart showing a mail preparation processing. When a user activates a mail preparation mode (S1101), a display shows a request for a mail type selection, such as whether it is a normal mail and whether mail change information for carrying out control of change of a mail content, mail opening availability and the like is added (S1102). In case of a normal mail, a user carries out input of text information such as writing and file attachment (S1103), and mail preparation is completed (S1112).

On the other hand, when addition of mail change information is selected (S1102), a display showing a request for input of the number of mail change conditions is generated (S1104). When the number of change conditions is inputted, displayed is a selection request of mail change conditions to mail change information of a first mail (S1105). As choices of mail change conditions, provided are an already-read number, time limit, a period, a location, cumulative duration of a call, cumulative charge for a call, and cumulative amount of data communication. Here, the "time limit" means a temporal condition which includes a date such as "BEFORE 2003/09/10" and the "period" means a temporal condition which does not include a date, such as "BEFORE LAPSE OF ONE WEEK AFTER OPENED".

In response to a selected mail change condition, input of the number of setting and the like is requested (S1106, S1107, S1108, S1113). For simplicity, in FIG. 5, a location, cumulative duration of a call, cumulative charge of a call, and cumulative amount of data communication are collectively referred to as various information.

After various information of the mail change condition is inputted, carried out is a selection request of whether mail opening is prohibited or not (S1109). If mail opening is not prohibited, input of a mail content such as a message is carried out (S1110).

In S1111, a determination is made as to whether input is completed or not by the number of change conditions which have been inputted in S1104. In case that two numerical values or more are inputted in S1104, after input of a first mail change condition is completed, input of a second mail change condition is carried out (S1105). If all of change conditions are not inputted, the process flow is returned to S1105, and input of the remaining change conditions is requested. If input of mail change information is completed for all of the change conditions which were inputted in S1104, in the mail preparation processing unit 8, data is converted in response to a format of a sending destination in S1111, and then, mail preparation is terminated (S1112).

For example, in the example of FIG. 4, as the mail change condition, "BEFORE LAPSE OF ONE WEEK AFTER OPENED" 902 is inputted, and "MAIL OPENING AVAILABLE" 903 is selected, and a mail content 1 904 is inputted. And, again, as the mail change condition, "AFTER LAPSE OF ONE WEEK AFTER OPENED" 905 is inputted, and "MAIL OPENING UNAVAILABLE" 906 is selected, and thereby, mail preparation is completed.

In addition, it may be configured such that input of the number of change conditions (S1104) is omitted, and when a first set of change information is inputted, "ADD OTHER CHANGE INFORMATION?" is displayed, and until a user inputs a completion instruction, a loop is repeated. In this way, a user can respond flexibly, even in case that a user happens to think to add a new change condition after having started the mail preparation.

In addition, this invention is not limited to having all of an already-read number, time limit, a period, a location, cumulative duration of a call, cumulative charge for a call, and cumulative amount of data communication as selection items of mail change conditions. Also, it is possible to add other conditions such as, for example, "YES OR NO OF MAIL SENDING TO PREDETERMINED MAIL ADDRESS," "YES OR NO OF CALL TO PREDETERMINED TELEPHONE NUMBER" and "YES OR NO OF ACCESS TO PREDETERMINED INTERNET SITE".

Figures 6, 7:
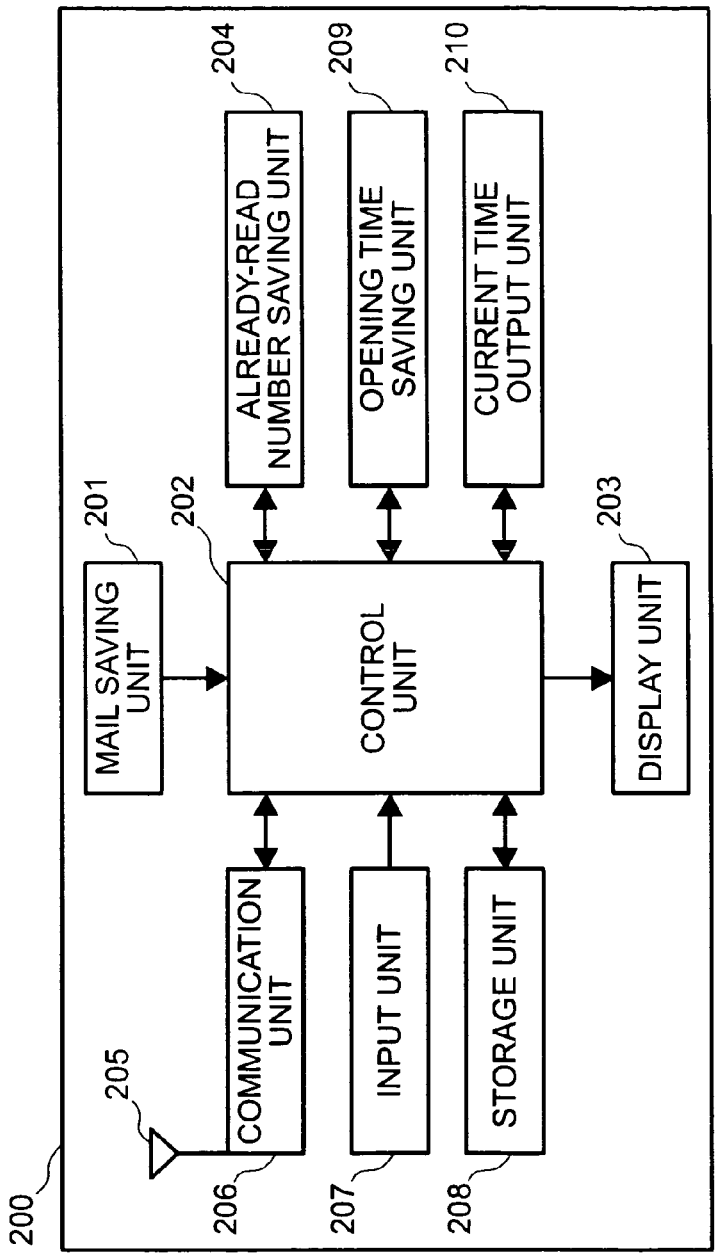
FIG. 6 is a view showing one example of mail change information.
FIG. 7 is a block diagram showing an example of a structure of a portable telephone which carries out mail reception.

Also, it may be advantageous to be able to select a plurality of selection items as the mail change condition. For example, as shown in FIG. 6, by combining time limit and yes or no of mail sending to prepare the mail change condition, it is possible for a sender side to control the mail so as to have a notice of holding a meeting and a content of inquiring for availability displayed at first, and to display reminder information in case there is no reply mail until the expiration of a time limit. In case of sending mails to many persons, if a user checks those persons who sent reply mails and those persons who did not send reply mails, and tries to send reminder mails to persons who did not send reply mails, it is very burdensome. In this embodiment, by adding the mail change condition to a mail and sending the mail, it is possible to have the reminder information displayed automatically. Also, an intention that there is information which is desired to be confirmed by a receiving side and an internet address of that information are treated as a mail content 1, and in case that there is no access to that address until certain time limit, it is possible to display a mail content 2 to urge for an access thereto.

Also, it may be desirable to not only control mail opening availability but also instruct deletion of a mail to a communication terminal of a receiving side, and a combination of them may be applicable. Also, the order of the mail change condition selection (S1105) and the mail opening availability selection (S1109) may be reversed.

In addition, on the occasion that there is an interruption such as an incoming call or shut-off of power supply in midstream of a flow, inputted information by the midstream is saved to a memory such as a RAM. After the call is completed or when power supply is restored, the flow of FIG. 5 is set to restart from the midstream, and thereby, it is possible to improve usability of a user.

Next, a processing method in a communication apparatus at a receiving side will be described. FIG. 7 is a view showing one embodiment of a portable telephone at a receiving side. In addition, a portable telephone is one example of the communication apparatus, and this invention may be applicable to another communication apparatus such as a PDA and a PC.

A portable telephone 200 has an antenna 205, and a communication unit 206. A display unit 203 is, for example, a liquid crystal display, and an input unit 207 is configured by dial keys and function keys. In this regard, however, a user may carry out a character input and a function selection by using and touching a touch panel type display unit such as the display unit 203. A storage unit 208 is a memory which includes a RAM and a ROM, and stores address book data and the like. A mail saving unit 201 saves a mail which has been received by the antenna 205 and the communication unit 206. A control unit 202 is a CPU, and controls display to the display unit 203, writing to the storage unit 208 and the like.

An already-read number saving unit 204 stores the number of mail opening instructions which were inputted by a user through the use of the input unit 207 with respect to each mail. A current time output unit 210 outputs current time. A opening time saving unit 209 saves the time at which each mail, which is saved in the mail saving unit, was opened.

In addition, in this embodiment, the storage unit 208, the mail saving unit 201, the already-read number saving unit 204, and the opening time saving unit 210 are provided separately, but it is possible to store them in one storage or memory unit. Also, the memory unit may be a removable storage media such as an IC card.

By use of FIG. 8, a method for displaying a received mail by the portable telephone 200 will be described. The control unit 202 carries out control processing which will be described below, by a program which is stored in the storage unit 208. In this regard, however, this program may be one which was installed in advance at the time of selling the portable telephone 200, and may be one which will be installed by a user after purchase of the portable telephone 200. In case that a user installs the program after purchased, a user will access a server which stores the program, and download the program and store it in the storage unit 208.

When a user inputs a mail opening instruction by use of the input unit 207 (S101), the control unit 202 determines whether or not the mail change information shown in FIG. 2 and the like is added as a mail control code in a header part of a mail which was instructed to be opened or in a mail text (S102). In the case of a normal mail, display processing is proceeded without any change (S110). On the other hand, in the case of a mail having mail change information, the mail change information is read in, and the type of the mail change condition is identified (S103).

For example, in the case of the change condition shown in FIG. 2, an already-read number which shows how many times the corresponding mail was opened is read in from the already-read number saving unit 204, and the already-read number in the already-read number saving unit 204 is overwritten with increase of 1 (S105). The already-read number which is a mail change condition of mail change information 301 and the already-read number which was read in S105 are compared to each other (S108), and corresponding information is read out from the mail saving unit 201, and displayed on the display unit 203 (S109). In addition, in the case where a mail was opened a second time (the already-read number is 1), the mail content 2 is displayed, and by displaying a display showing a different thing from a previous mail display, for example, by displaying characters and marks such as "NEW" or "CHANGED TO NEW INFORMATION!", it is possible to inform a user of a fact that display was changed to new information.

In the case where the change information shown in FIG. 3 is added, the control unit 202 reads in the mail change information, and when identified as a type of the mail change condition (S103), reads in current system time from the current time output unit 209 (S104). The control unit 202 compares the current time and "MAIL CHANGE CONDITION" of mail change information 601 (S108), and displays a corresponding mail content (S109). For example, when a mail opening instruction is issued on Sep. 9, 2003, 2003/09/09 is read in as the current time, and the mail content 1 603, which is the corresponding information, is displayed. And, in case there is a mail opening action again on Sep. 15, 2003, in the same manner, the current time is read in, and the mail content 2 605 is displayed.

In the case where the change information shown in FIG. 4 is added, the control unit 202 reads in the mail change information, and when identified as a type of the mail change condition (S103), reads in the current time from the current time output unit 210, and reads in the opening time which is stored in the opening time saving unit, and calculates an elapsed time period from when a mail was opened (S106). In this regard, however, if the mail was opened for the first time, the opening time is not recorded in the opening time saving unit 209. In this case, the current time is stored as opening time. The control unit 202 compares the mail change condition and the elapsed time period, and controls display of a mail content in response to the result of the comparison (S109).

For example, in case that a mail was opened for the first time on Sep. 9, 2003, and next, there was an instruction of opening again from a user on Sep. 20, 2003, the control unit 202 reads out "2003/09/20", which is the current time, from the current time output unit 210, and reads out "2003/09/09", which is the opening time of a corresponding mail, from the opening time saving unit 209, and calculates a period from when it was opened (S704). In this case, the period is 11 days, and this period and the mail change condition are compared to each other. In this case, it corresponds to the mail change condition "AFTER ELAPSE OF ONE WEEK AFTER OPENED", it is judged that mail opening is not permitted, and display of a mail content is not carried out. At this time, in order to inform a user of the fact that mail display is not possible, it is desirable to display a message of "CANNOT DISPLAY SINCE MAIL OPENING TIME LIMIT IS EXPIRED" and the like on the display unit 203. Also, by additionally displaying a query text of "DELETE MAIL?", it is possible to urge a user for mail deletion.

In addition, in case that information of mail opening unavailable is included, in case that a mail is opened and displayed for the first time by a user instruction, or in case that a mail is closed by a user instruction, it is desirable to display a message of "CANNOT SEE THIS MAIL AFTER LAPSE OF ONE WEEK AFTER OPENED" and the like. By displaying in this manner, it is possible to inform a user of a fact that the mail is a mail with time limit, and to urge the user for attention.

Figure 8:
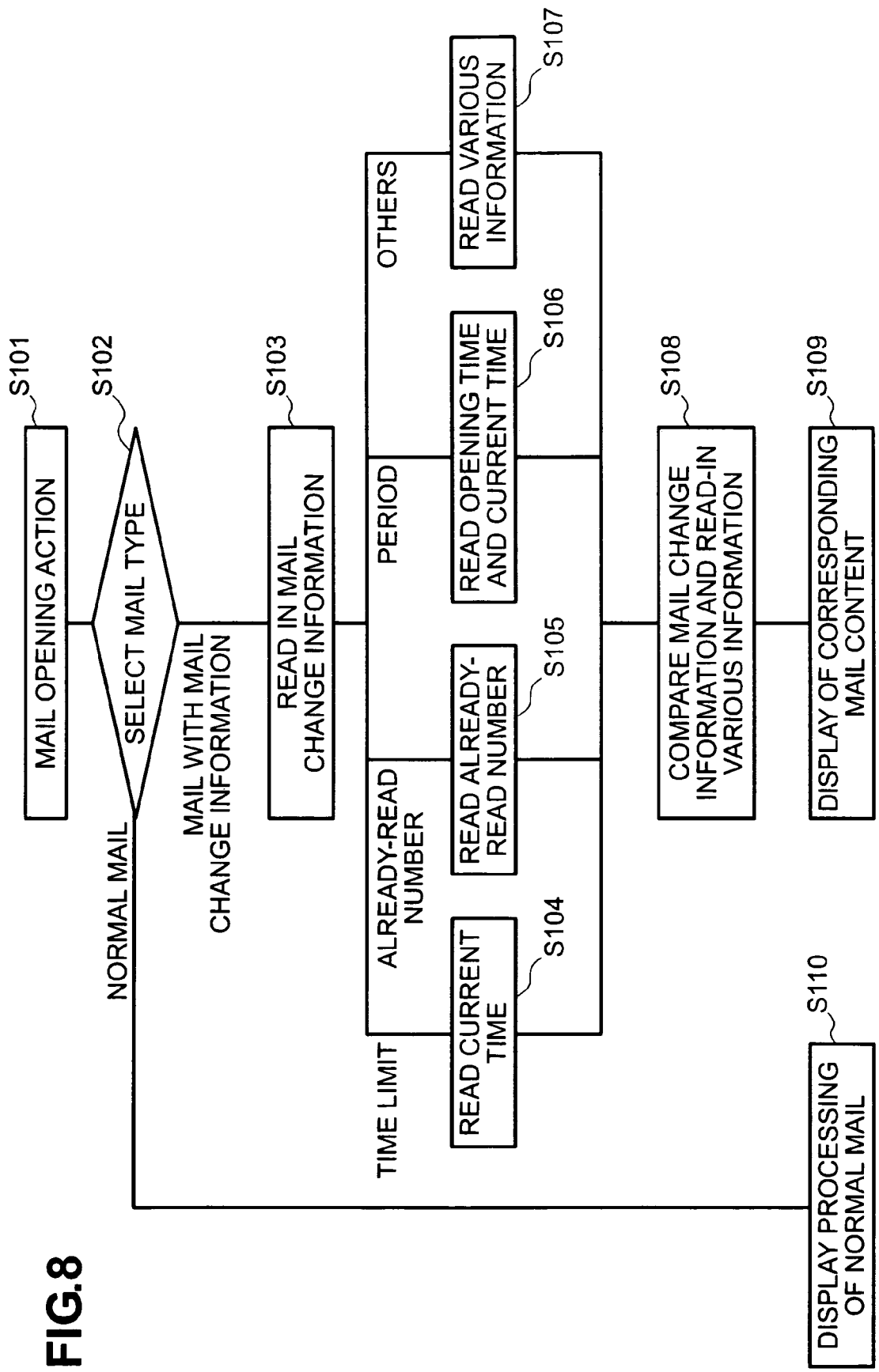
FIG. 8 is a flow chart showing display processing of a received mail.

In addition, the structure of the portable telephone shown in FIG. 7, and the flow chart shown in FIG. 8 are of one embodiment of this invention, and this invention is not limited by the specific embodiment shown. For example, in the case where a service is provided with limiting a change condition of mail change information only to the already-read number, the opening time saving unit 209, "read current time" step S104 and the like may be omitted. Also, when a momentum of period setting is set to "MAIL RECEPTION"

instead of "MAIL OPENING," since mail reception time is described in a Date field of a mail header, it is possible to omit the opening time saving unit 209 in FIG. 7.

Also, in response to mail change information to be processed, another structure may be added to the portable telephone. For example, in case that a mail, to which mail change information with a location as a change condition is added, is received, and in response to the change information, display is made to be changed, a position detection unit such as GPS is provided in the portable telephone 200. Also, in order to respond to a mail, to which change information with cumulative duration of a call and charge for a call, and cumulative amount of data communication as change conditions were added, there is a need to store the cumulative duration of a call etc. in the storage unit 208.

As described above, a mail author adds mail change information to a mail and sends the mail so that a mail author can control mail display at a receiving side. Since a plurality of information is sent in advance by adding information presentation timing thereto, even in a situation where a receiver cannot receive a mail at the information presentation timing, such as NO SERVICE AREA, it is possible to timely present the information.

Figure 9:
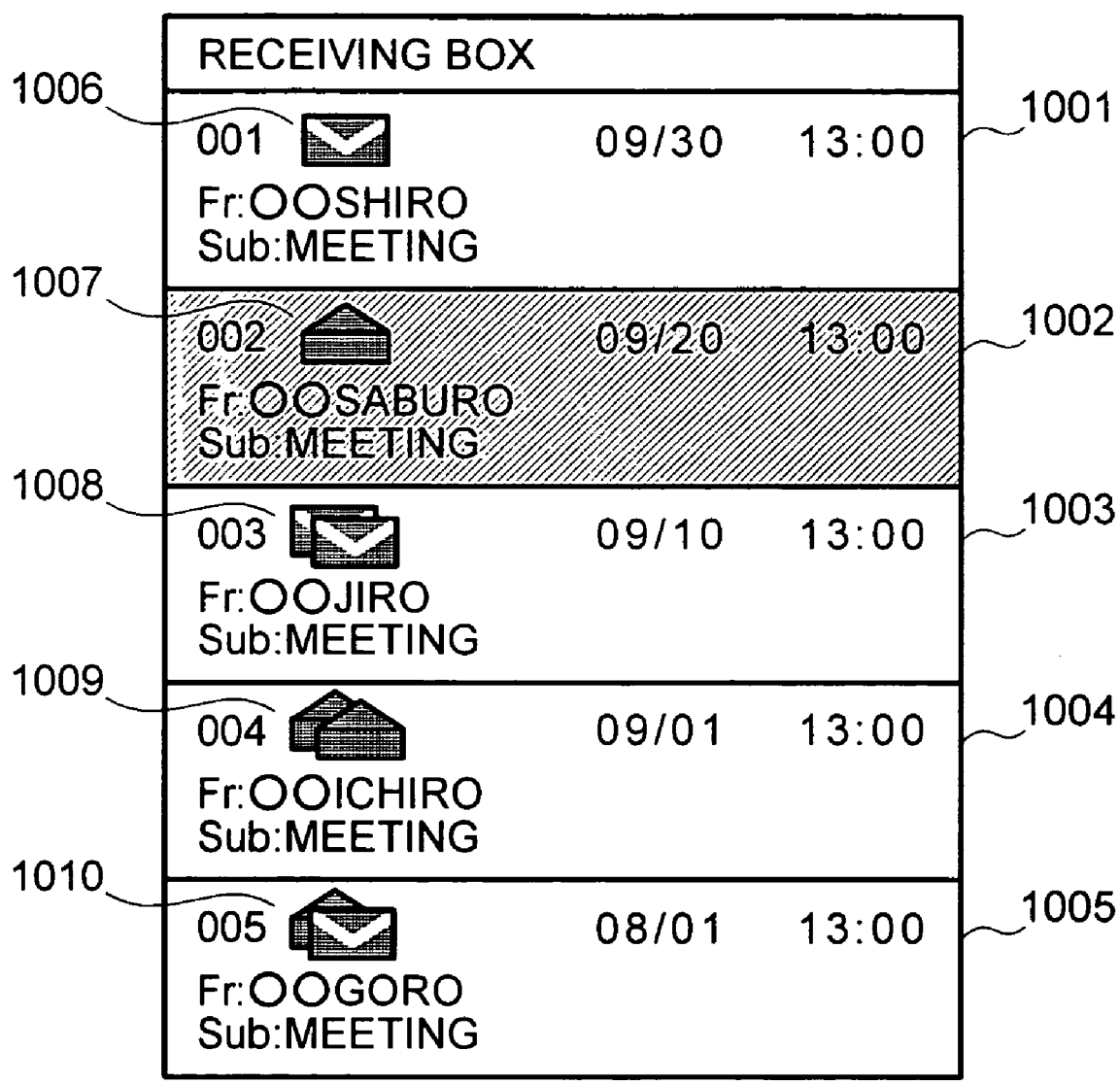
FIG. 9 is a view showing one example of a received mail list screen.

Next, a method for having a receiver recognize that a mail, which is different from a conventional mail, has arrived, on the occasion that a mail which relates to this embodiment was received will be described. FIG. 9 shows an example of a received mail list screen which is displayed on the display unit 203.

Reference numeral 1001 designates the latest mail which has reached to the portable telephone, and it shows that it was received at 13:00 on September 30. In the same manner, 1002, 1003, 1004, and 1005 show that they were received at 13:00, September 20, September 10, September 1, and August 1, respectively. In a sequential order from the latest mail including 1001, numbers are given in such a manner of 001, 002, 003, 004, 005. Also, a mail address of a mail sender, or a nickname which is registered in an address book of a portable telephone is displayed at the right side of "Fr:", and subject matters of respective mails are displayed at the right side of "Sub:". In addition, at present, 1002 is selected and the background is of a gray display. When a user of a portable telephone presses down a lower key, which is one of the input unit 207, and 1003 is selected, the background of 1003 is changed to a gray display.

In FIG. 9, graphical symbols in the form of envelope marks which are located to the right sides of respective mail numbers 001 to 005 show the types of mails. Graphical symbols 1006 and 1007 indicate that they are normal mails without mail change information attached. The symbol 1006 indicates a situation that a mail has not yet opened, or that a mail is received from a mail server and a mail text has not yet been downloaded in a portable terminal. The symbol 1007 indicates that a mail was already opened.

Graphical symbols which indicate that mail change information is added are 1008, 1009, and 1010. The number of envelope marks indicates the number of change conditions. For example, in case there are two change conditions as in FIG. 2, two envelop marks are displayed in piles, and in case there are three change conditions as in FIG. 3, three envelop marks are displayed in piles. For example, 1010 indicates a case where there are two change conditions, and after a first mail was displayed, there remains mail contents which are not displayed. In this regard, however, this invention is not limited to this, and regardless of the number of change conditions, in case that mail change information is added, two envelop marks may be displayed.

In addition, an envelope mark, to which a number is given, is displayed, and an envelop mark which can be displayed at present may be displayed on the foreground. For example, in the case where the mail shown in FIG. 3, to which mail change information was added, is received, mail contents 1, 2, and 3 are displayed by envelope marks 1, 2, and 3, respectively, and at a time point of Sep. 12, 2003, the envelope mark 2 is displayed on the foreground. By this, a user can know what numbered information a user can see by displaying the same.

Even a mail which was previously received, when it becomes possible to display a new content by mail change condition, may be displayed on list number 001 as the latest received mail. There is a case that a user is unaware of a fact that the status of a mark was changed even if it is changed. By displaying as the latest mail on a received mail list screen, a user can easily recognize that there is new information. Also, it may be designed to display a warning message of "MAIL CONTENT WAS CHANGED!" on the display unit 203, or to have an alarm sounded. In this case, for example, at certain intervals such as once a day or once a week, the control unit 202 controls the process so as to execute S102 to S108 shown in FIG. 8, and to confirm mail change conditions of each mail. In addition, the control unit 202 may be configured to control the process so as to confirm mail change conditions as to all mails, but by controlling the process so as to check only mails which a user designated and mails which are entered in a specific folder, it is possible to suppress power consumption and to prevent a user from treating an unnecessary mail as a new mail.

In case that mail opening unavailable information is included, it is desirable to display this by changing a color of the envelope mark, and to display a mark for promoting awareness of it, such as a clock mark on the envelope mark. Furthermore, by user's setting, it may be desirable to display a message of "CANNOT SEE MAIL WITH NUMBER 00 FROM DATE 0" and the like, several day or several hours before opening becomes unavailable, or to have an alarm sounded. By sending a notice in advance in this manner, it is possible to urge a user for attention, and give the user the opportunity of mail confirmation. Also, it is possible to display an icon or the like which indicates that a mail with time limit is saved in a mail box, in an idle (standby) screen. In this case, since a user can know that there is a mail with time limit by the idle screen, it is possible to effectively urge a user for reopening.

In addition, these displays may be displayed for the first time when a predetermined period, which was defined in mail change conditions, has passed, and the like. This is because there is no need to urge for re-opening until a mail content is changed. In addition, this message may be applied only to a specific mail which a user set. In case that notices are sent to all mails with mail opening unavailable information, this may have the opposite troublesome effect to a user. A notice is sent only to a mail which is desired by a user to be re-confirmed so that it is possible to provide a portable telephone with good usability.

Next, an embodiment is described for a case where a mail with mail change information was received, setting of whether change of a mail content is permitted or not is carried out at a receiving side.

In this embodiment, a user inputs, by use of the input unit 207, an address which a user wishes to reject changes even when a mail with mail change information was transmitted, and has the storage unit 208 stored the address. In this case, before or after S102 in FIG. 8, a mail address of a sending destination is confirmed, and in case a mail with mail change information was received from an address without permission of mail change, it is treated as a normal mail and display processing is carried out.

For example, when the mail being sent is a spam mail with mail change information in which a mail content is changed once several minutes, and the number of that changes reaches to several hundred, mail change is notified every several minutes, which is very troublesome. As in this embodiment, by arranging not to change a mail content as to a mail from a specific address, it is possible to improve usability. In this embodiment, an address without permission of change was registered, but it may be desirable to permit only a mail which was sent from a specific registered address.

According to this invention, it is possible to provide a mail sending and receiving method by which a sender side can control a mail display content at a receiver side, and a communication terminal which is used for this purpose. It is noted that the various units or modules in the communication device may be configured in hardware or in software which is stored in a computer readable medium to be executed by a processor such as the CPU in the control unit 7.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A communication device comprising:
   a display unit;
   a receiving unit configured to receive a mail which includes a plurality of mail contents and condition information governing which of the plurality of mail contents can be displayed, the condition information including information corresponding to the plurality of mail contents based on an already-read number of the mail;
   a storage unit configured to store the mail which is received by the receiving unit; and
   a control unit configured to control display of the plurality of mail contents by the display unit in response to the condition information and the already-read number of the mail, when a display instruction of the mail which is stored in the storage unit is inputted.

2. The communication device as set forth in claim 1, wherein the condition information includes information indicating that display of the mail is prohibited after a predetermined date, and wherein when a display instruction of the mail is inputted after the predetermined date, the display unit displays a message showing that the mail contents of the mail cannot be displayed.

3. The communication device as set forth in claim 1, wherein the plurality of mail contents comprise mail text.

4. A communication device comprising:
   a display unit;
   a receiving unit configured to receive communication information which includes a plurality of message contents and condition information governing which of the plurality of message contents can be displayed, the condition information including display condition information corresponding to the plurality of message contents based on an already-read number of the communication information;
   a storage unit configured to store the communication information which is received by the receiving unit; and
   a control unit configured to control display of the plurality of message contents by the display unit in response to the condition information and the already-read number of the communication information, when a display instruction of the communication information which is stored in the storage unit is inputted.

5. A method for sending a mail, the method comprising:
   preparing a mail which includes a plurality of mail contents and display condition information corresponding to the plurality of mail contents based on an already-read number of the mail; and
   sending the prepared mail to an address of a mail sending destination.

* * * * *